Figure 3:
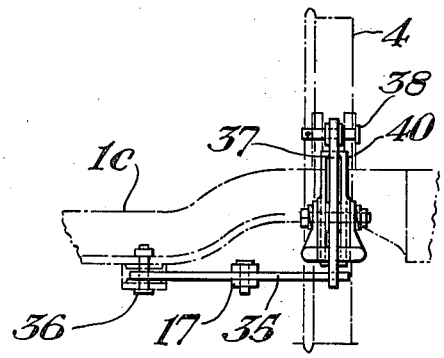

June 7, 1949.    E. G. MUELLER    2,472,169
BRAKE RIGGING
Filed April 16, 1946    4 Sheets-Sheet 1
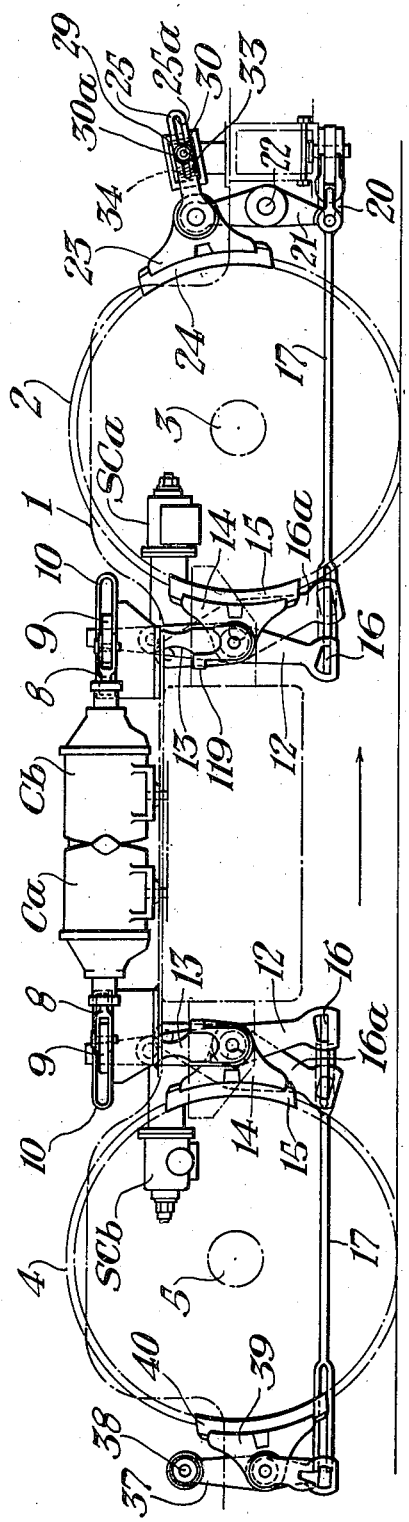
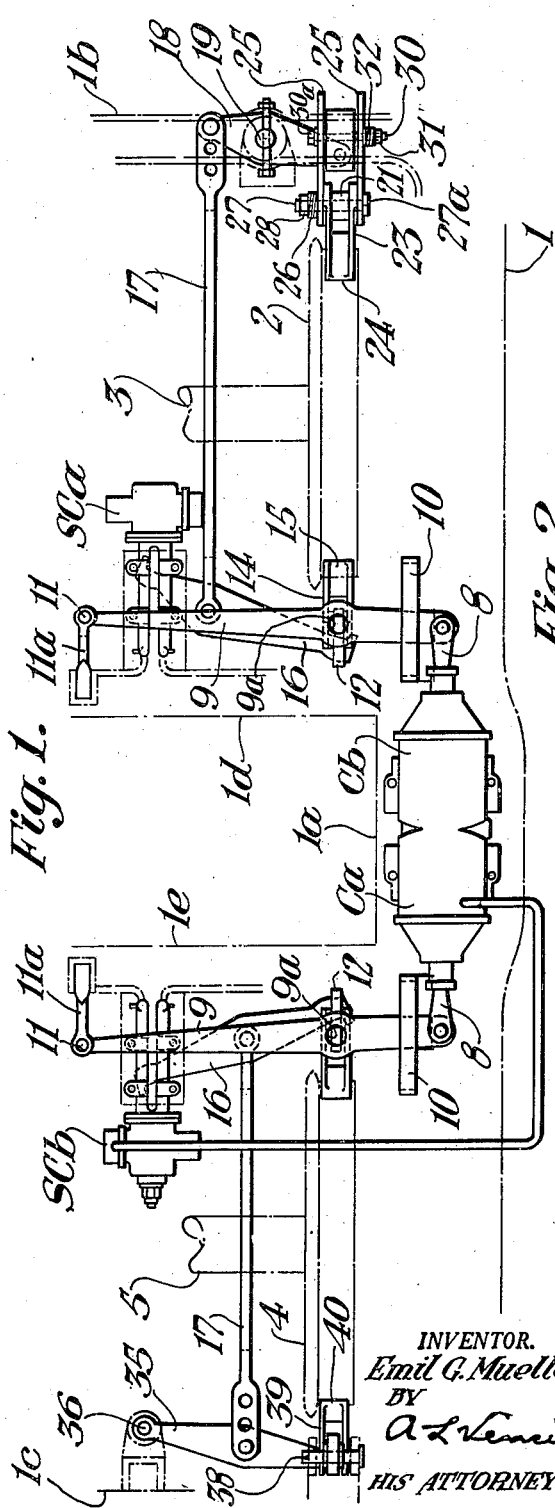
INVENTOR.
Emil G. Mueller
BY
A. L. Vermill
HIS ATTORNEY INVENTOR.
Emil G. Mueller
HIS ATTORNEY

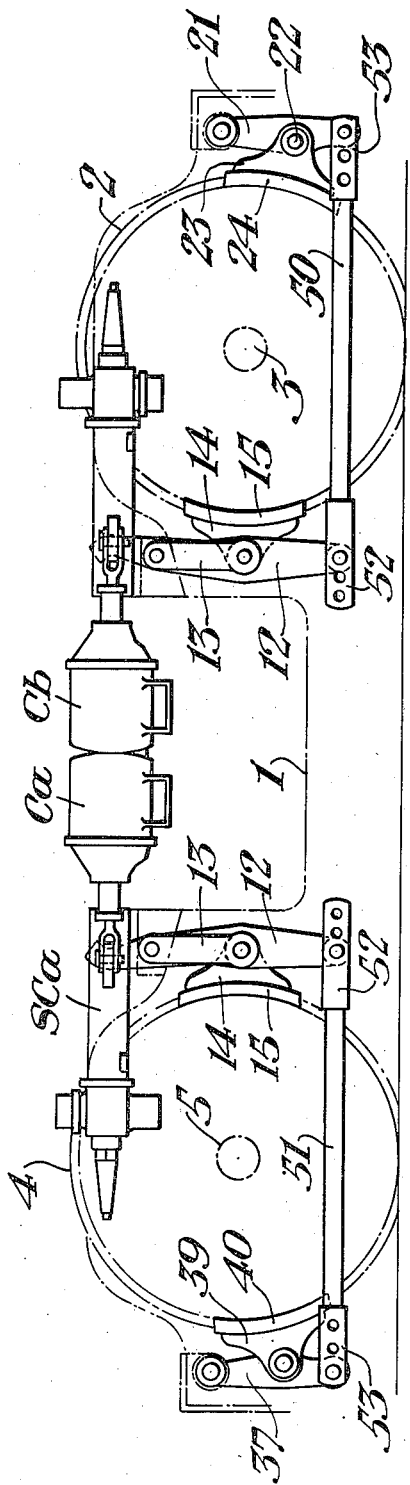

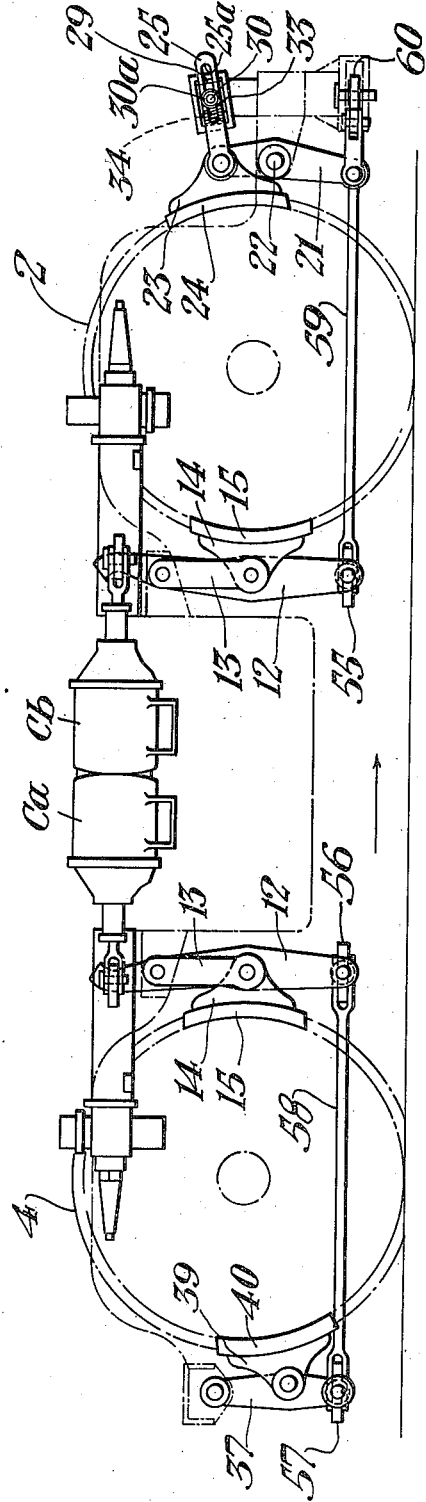
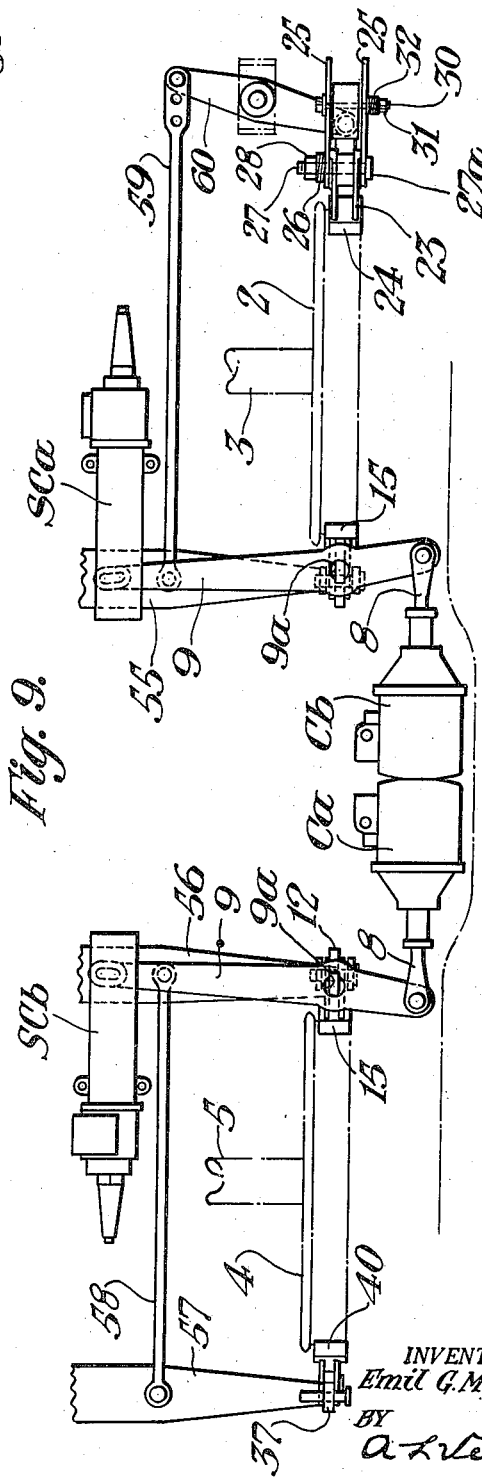

Patented June 7, 1949

2,472,169

UNITED STATES PATENT OFFICE 2,472,169

BRAKE RIGGING

Emil G. Mueller, Churchill Borough, Pa., assignor to The American Brake Company, Swissvale, Pa., a corporation of Missouri Application April 16, 1946, Serial No. 662,657

10 Claims. (Cl. 188—56)

My invention relates to brake rigging for railway rolling stock, and particularly to brake rigging of the clasp type which is suitable for, although in no way limited to, use on the guiding trucks of modern high speed steam turbine electric locomotives.

One object of my invention is to provide brake rigging of the type described having the minimum weight capable of providing the required braking force with the proper factor of safety.

Another object of my invention is to provide brake rigging of the type described which will permit a relatively high braking force to be applied to the truck wheels without causing undue tipping of the truck frame.

A further object of my invention is to provide brake rigging of the type described so located with respect to the adjacent parts of the vehicle as to permit the proper movement of the various parts of the brake rigging without interference by or with the adjacent parts of the vehicle.

According to one form of my invention, duplex brake cylinders are mounted on the truck between the wheels outboard of the truck, and the piston rods of these brake cylinders are operatively connected with the outer ends of relatively long transversely extending horizontal brake cylinder levers, the inner ends of which are pivotally attached to fixed fulcrums secured to the truck frame. The brake cylinder levers are operatively connected intermediate their ends with the upper ends of live levers which are pivotally supported from the truck frame by means of hangers and which carry brake heads provided with brake shoes for frictionally engaging the rear side of the front wheel and the front side of the rear wheel, respectively. The lower ends of the live levers are operatively connected with the outer ends of horizontally disposed transversely extending equalizer levers the inner ends of which are operatively connected with automatic slack adjusters. The equalizer lever associated with the forward wheel of the truck is operatively connected intermediate its ends by means of a pull rod with the inner end of a horizontal transversely extending transmitting lever pivotally supported intermediate its ends on the truck frame, while the equalizer lever associated with the rear wheel is operatively connected by means of a pull rod with a transversely extending horizontally disposed transmitting lever intermediate its ends. The outer end of the transmitting lever associated with the forward wheel is operatively connected with the lower end of a vertically disposed brake lever which is pivotally supported intermediate its ends, and the upper end of which carries a brake head provided with a brake shoe for frictionally engaging the associated wheel at the forward side of the wheel. The transmitting lever associated with the rear wheel is pivotally attached at its inner end to the truck frame and is operatively connected at its outer end with the lower end of a hanger lever provided intermediate its ends with a brake head carrying a brake shoe for frictionally engaging the associated wheel at the rear side of the wheel. In order to prevent tipping of the truck frame during a brake application, the brake shoes associated respectively with the front wheel of the truck at the rear side of the wheel and with the rear wheel of the truck at the forward side of the wheel are located substantially at or slightly above the plane of the wheel centers, while the brake shoe located at the forward side of the front wheel is disposed above this plane and the brake shoe located at the rear side of the rear wheel is disposed below this plane. Furthermore, the parts are so proportioned that when the brake shoes are engaging the wheels, the resultant forces which are exerted on the truck frame due to the frictional contact of the brake shoes with the wheels will tend to balance each other so that the net force tending to tip the truck will be reduced to such an extent that substantially no tipping will result.

In a modified form of this brake rigging the brake cylinder levers instead of being fulcrumed at their inner ends on fixed fulcrums are fulcrumed in automatic slack adjusters, and the lower ends of the live levers are connected respectively by straddle rods with the brake lever disposed at the forward side of the forward wheel and the hanger lever disposed at the rear side of the rear wheel.

In still another modification of this brake rigging, the lower ends of the live levers disposed between the wheels are operatively connected in supporting relation thereto with brake beams, and the brake beam disposed at the rear side of the forward wheel is operatively connected by means of a pull rod with the inner end of the previously referred to transmitting lever, while the brake beam disposed at the forward side of the rear wheel is operatively connected intermediate its ends by means of a pull rod with another brake beam disposed at the rear side of the rear wheel, which latter brake beam is supported at its ends by means of the hanger levers described in the preferred form of my invention.

Other objects and characteristic features of my invention will become apparent as the description proceeds.

I shall describe three forms of brake rigging embodying my invention, and shall then point out the novel features thereon in claims.

Figure 4:
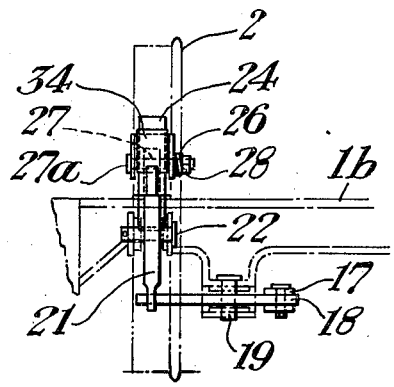
Figure 5:
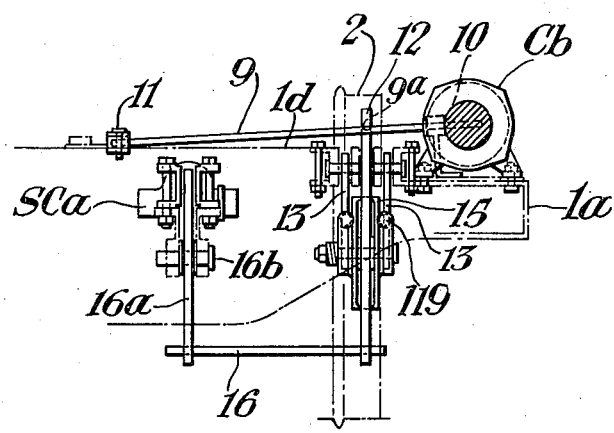
Figure 6:
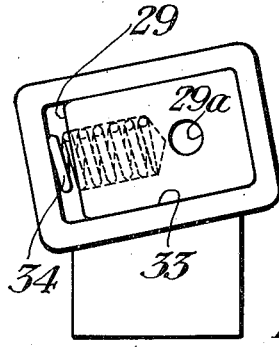

In the accompanying drawings, Fig. 1 is a side elevational view showing a brake rigging embodying my invention applied to the guiding truck for a steam turbine electric locomotive. Fig. 2 is a plan view of the brake rigging for one side of the truck illustrated in the preceding view. Figs. 3 and 4 are fragmentary left-hand and right-hand end views of the guiding truck and brake rigging shown in Figs. 1 and 2. Fig. 5 is a transverse sectional view of the truck and brake rigging shown in Figs. 1 and 2 looking toward one end of the truck from substantially the middle of the truck. Fig. 6 is a detail view of a portion of the brake rigging shown in Figs. 1 and 2. Figs. 7 and 8 are side elevational and partial top plan views showing a modified form of brake rigging embodying my invention applied to the guiding truck of a steam turbine electric locomotive. Figs. 9 and 10 are side elevational and fragmentary top plan views showing still another form of brake rigging embodying my invention applied to the guiding truck of a steam turbine electric locomotive.

Similar reference characters refer to similar parts in each of the several views.

Referring first to Figs. 1 to 5, inclusive, of the drawings, I have here shown my invention applied to a four-wheel guiding truck having a frame 1 supported at one end by a wheel and axle assembly comprising a pair of wheels 2 mounted on an axle 3, and at the other end by a wheel and axle assembly consisting of a pair of wheels 4 mounted on an axle 5. The truck frame may have any preferred construction, but as here shown it comprises spaced longitudinally extending side members 1a connected together by spaced transversely extending end members 1b and 1c and intermediate connecting members 1d and 1e. The means for supporting the truck frame by the wheel and axle assemblies is not shown because these means are well known and form no part of my present invention.

The brake rigging comprises two separate sets of mechanisms one of which is located at each side of the turck. These mechanisms are identical and it is believed, therefore, that an understanding of the brake rigging as a whole will be had from a description of the mechanism which is located at one side only of the truck. The mechanism as shown comprises a duplex brake cylinder assembly consisting of two brake cylinders Ca and Cb secured to the truck frame outboard of the wheels between the wheels by means of a suitable supporting shelf provided on the side member 1a. The brake cylinders are of the usual type, and each includes the usual cylinder portion, piston and return spring (not shown), and push rod 8 operated by the piston.

The push rod 8 of the cylinder Cb is operatively connected with the outer end of a transversely extending horizontally disposed brake cylinder lever 9 which is slidably supported adjacent to the brake cylinder in a suitable supporting guideway 10 provided on the truck frame, and which is pivotally attached at its inner end by means of a pivot pin 11 with a fulcrum jaw 11a welded or otherwise secured to the truck frame. The lever 9 is provided intermediate its ends with a hole 9a which receives the upper end of a vertically disposed live lever 12. This latter lever, in turn, is pivotally supported intermediate its ends by means of hangers 13, and carries a brake head 14 provided with a brake shoe 15 for frictionally engaging the associated wheel 2 at the rear side of the wheel. Associated with the brake head 14 and live lever 12 are friction means 119 of well-known construction for maintaining the brake shoe 15 in concentric relation with respect to the wheel 2 when the brake means are released. Since these means form no part of my present invention, it is believed to be unnecessary to describe them in detail herein.

The lower end of the live lever 12 is operatively connected with the outer end of a horizontally disposed transversely extending equalizer lever 16, the inner end of which is connected with the lower end of slack adjuster fulcrum lever 16a. The slack adjuster fulcrum lever 16a is pivotally supported intermediate its ends on a pivot pin 16b, and is operatively connected at its upper end with the fulcrum block of a slack adjuster SCa mounted on a suitable support provided on the frame member 1d between the wheels.

The slack adjuster SCa by itself forms no part of my present invention, and may comprise any of the well-known types of slack adjusters which will move the effective point of connection of the upper end of the slack adjuster fulcrum lever toward the left a predetermined amount sufficient to take up the slack whenever slack develops in the brake rigging, as will appear somewhat more fully hereinafter.

The equalizer lever 16 is operatively connected intermediate its ends by means of a pull rod 17 with the inner end of a horizontally disposed transversely extending transmitting lever 18 which is pivotally supported intermediate its ends on a pivot pin 19 mounted in the end member 1b of the frame 1. The transmitting lever 18 is operatively connected at its outer end by means of a clevis 20 with the lower end of a vertical brake lever 21. This latter lever is pivotally supported intermediate its ends on a pivot pin 22 mounted in the end member 1b of the frame 1, and is provided at its upper end with a brake head 23 carrying a brake shoe 24 for frictional engagement with the wheel 2 at the forward side of the wheel.

Associated with the brake head 23 and brake lever 21 are means for maintaining the brake shoe 24 in concentric relation with respect to the wheel 2 to prevent the brake shoe from dragging when the brakes are released, combined with means for insuring that the parts will return to the desired released positions in which the brake shoe is clear of the wheel upon the release of the brakes following a brake application. As here shown, these means comprise two similar friction levers 25 which are disposed on opposite sides of the brake head 23 and which are clamped into frictional engagement with the brake head by means of a compressed coil spring 26 disposed on the pivot pin 27 which secures the brake head 23 to the brake lever 21. The pivot pin 27 is provided at one end with a head 27a and at the other end with a nut 28, and the nut is so adjusted that the frictional force exerted by the spring 26 is sufficient to maintain the brake head in the same relative position with respect to the lever 21 when the brakes are released that it occupied during the last brake application, whereby when the brakes are released, the brake head will be maintained in substantially concentric relation with respect to the wheel 2.

The free ends of the friction levers 25 are provided with longitudinally extending slots 25a, and are clamped into frictional engagement with the opposite sides of a friction block 29 (see Fig. 6) by means of a pivot pin 30 which extends with clearance through the slots 25a and through a suitable opening 29a in the friction block. The pivot pin is provided at one end with an enlarged head 30a and at the other end with a castellated nut 31 and interposed between the nut and the adjacent friction lever is a compressed coil spring 32. The friction block is slidably supported for longitudinal sliding movement in a suitable guideway 33 secured to the end member 1b of the frame 1 and is biased to the right-hand end of the guideway by means of a suitable spring 34 (Fig. 6). The parts are so proportioned that the frictional contact which normally exists between the friction levers and the friction block will be sufficient to cause the block and levers to move as a unit and compress the spring 34 when the brakes are applied with the result that when the brakes are subsequently released, the spring 34 acting through the friction levers will exert a force on the brake head and associated brake parts which will move these parts to the desired released positions. If, however, due to brake shoe or wheel wear the amount of movement of the brake head 23 necessary to apply the brakes exceeds that permitted by the allowable compression of the spring 34, then the friction levers will move relative to the friction block to a new position with the result that the release device just described will function automatically to maintain a fixed clearance between the brake shoe and the wheel when the brakes are in their released positions.

The portion of the brake mechanism associated with the rear wheel 4 of the truck is identical to that associated with the forward wheel 2 up to and including the pull rod 17. The left-hand end of this pull rod, however, is operatively connected with a transversely extending horizontally disposed transmitting lever 35 intermediate its ends, and the lever 35, in turn, is pivotally connected at its inner end to the end member 1c of the truck frame by means of a pivot pin 36 and is operatively connected at its outer end with the lower end of a hanger lever 37. The hanger lever 37 is pivotally attached at its upper end to the truck frame by means of a pivot pin 38 and is provided intermediate its ends with a brake head 39 carrying a brake shoe 40 for frictional engagement with the wheel 4 at the rear side of the wheel.

In operation when it is desired to apply the brakes, fluid pressure is simultaneously admitted to the duplex brake cylinders Ca and Cb to thereby force the push rods 8 of these cylinders to their outer extreme positions. The outward movement of these push rods will cause the brake cylinder lever 9 disposed at the rear side of the wheel 2 to rotate in a counterclockwise direction, and the lever 9 disposed at the forward side of the wheel 4 to rotate in the opposite direction. This rotation of these brake cylinder levers, in turn, will move the upper ends of the live levers 12 toward the associated wheels until the brake shoes 15 carried thereby engage the wheels, whereupon these live levers will then rotate about their points of connection with the brake heads 14 and will thus move the lower ends of the live levers toward each other. This latter movement of the live lever 12 associated with the wheel 2 will act through the equalizer lever 16 and pull rod 17 to rotate the transmitting lever 18 in a counterclockwise direction about the pivot pin 19 and hence will rotate the lever 21 to the position in which the brake shoe 24 frictionally engages the wheel 2. In a similar manner the rotation of the live lever 12 associated with the wheel 4 about its point of connection with the brake head 14 will act through the associated equalizer lever 16 and pull rod 17 to rotate the transmitting lever 35 in a counterclockwise direction about the pivot pin 36 and hence will move the brake shoe 40 into frictional contact with the wheel 4.

It will be obvious that when the truck is moving toward the right in Figs. 1 and 2, as will normally be the case, and the brake shoes are moved into frictional contact with the wheels, the frictional forces which are set up by the rotation of the wheels will tend to move the shoes which are disposed at the forward sides of the wheels downwardly and the shoes which are disposed at the rear sides of the wheels upwardly. The downward and upward forces which are exerted on the shoes will, of course, be transmitted to the truck frame through the associated supporting levers in an obvious manner, with the result that the forces exerted by the two outside shoes 24 and 40 will act through the relatively long lever arms extending between the points of attachment of the brake lever 21 and hanger lever 37 with the truck frame and the center of the frame to exert a clockwise torque on the frame, while the forces exerted by the two inside shoes 15 will act through the relatively shorter lever arms extending between the point of attachment of the associated hangers 13 with the frame and the center of the frame to exert an opposing torque on the frame. With clasp brakes of the type described as they are generally constructed, due to the fact that the outer shoes exert their torque through longer lever arms, the clockwise torque will greatly exceed the opposing torque, and as a result the net torque on the frame will tend to produce serious tipping of the frame and result in excessive strains on frame, springs and associated members. This tipping is obviously undesirable, and in order to balance the two opposing forces insofar as possible and still maintain uniform shoe pressures to avoid strains on the wheel journals and boxes, I locate the brake shoes in such positions with respect to the associated wheels that the brake lever forces which are applied to the shoes to maintain the shoes in frictional contact with the wheels will cause a force component to be exerted on the truck frame which opposes that resulting from the rotation of the wheels. The exact locations of the shoes necessary to accomplish this result will vary somewhat with the intended locomotive speeds, the wheel spacing, weight, distribution of the brake, coefficient of friction, etc., but in general in order to accomplish this result it is necessary that the center of the shoe 24 located at the forward side of the wheel 2 be disposed some distance above the wheel centers, and the center of the shoe 40 located at the rear side of the rear wheel 4 be disposed some distance below the wheel centers and that the centers of the remaining two shoes be located substantially on or slightly above or below the wheel centers as the case may be. With this location of the shoes the actual forces applied to the brake shoes to effect a brake application may be maintained substantially uniform and the resultant torque exerted on the truck frame during a brake application tending to produce tipping of the truck frame may be reduced to such an extent that its effects are substantially negligible.

When the brakes have been applied in the manner described above and it is desired to release the brakes, the fluid pressure which was supplied to the brake cylinders Ca and Cb to effect the brake application is vented to atmosphere, thereby removing the force which moved the push rods of the brake cylinder to their brake applying positions. As soon as this force is removed, the release springs in the brake cylinders will tend to return the push rods to their inner extreme positions and all of the brake shoes with the exception of brake shoe 24 will tend to immediately return to their released positions under the influence of gravity. The brake shoe 24, however, due to its overhanging position tends to remain in its brake applying position. This tendency, however, is overcome by the release spring 34 which immediately moves the friction block 29 to its outer position in the associated support and thereby acts through the friction levers 25 to move the brake shoe 24 away from the wheel to the desired release position.

If slack develops in the brake rigging, the resultant additional movement of the pistons of the brake cylinders Ca and Cb necessary to effect an application of the brakes will cause fluid pressure to be admitted to the automatic slack adjusters SCa and SCb in the manner previously described, and the fluid pressure thus admitted to the slack adjusters will cause the equalizer lever 16 associated with the slack adjuster SCa to be rotated in a counterclockwise direction about its point of connection with the pull rod 17 a sufficient amount to take up the slack in the brake rigging associated with the wheel 2, and the equalizer lever 16 associated with the slack adjuster SCb to be rotated in a counterclockwise direction a sufficient amount to take up the slack in the brake rigging associated with the wheel 4.

Referring now to the modified form of brake rigging illustrated in Figs. 7 and 8, in this form of brake rigging the slack adjusters SCa and SCb are connected directly with the inner ends of the levers 9, thus eliminating the necessity for the levers 16a, 16, 18 and 35, and the pull rods 17 employed in the brake rigging shown in the preceding views. With these parts eliminated, the lower end of the live lever 12 disposed at the inner side of the wheel 2 is connected directly with the lower end of the brake lever 21 by means of straddle rods 50 disposed on the opposite sides of the wheel 2, and the live lever 12 disposed at the forward side of the wheels 4 is similarly directly connected with the lower end of the hanger lever 37 by means of straddle rods 51. The straddle rods 50 and 51 are provided at their inner and outer ends with adjustable pin hole take-ups 52 and 53 of well-known construction to permit any slack which develops in the brake rigging to be taken up. The construction of the take-ups is well known and forms no part of my present invention. It is believed to be unnecessary, therefore, to describe these constructions in any further detail herein.

The operation as a whole of the brake rigging shown in Figs. 7 and 8 will be obvious from an inspection of the drawings without further detailed description.

It should be pointed out that with the brake rigging constructed as shown in Figs. 7 and 8, the slack adjusters SCa and SCb may, if desired, be omitted, in which event it will be necessary to take up all slack which may develop in the brake rigging by means of the take-ups 52 or 53 as will be obvious.

It should also be pointed out that with the brake rigging constructed as shown in Figs. 7 and 8, inasmuch as the brake shoe 24 is disposed below the plane of the wheel centers this brake rigging will not effectively prevent tipping of the truck. However, since all of the brake shoes with the exception of the shoe 24 are disposed in the proper positions to minimize tipping, tipping of the truck can be prevented, if desired, merely by raising the pivot point for the lever 21 upwardly to such a position that the brake shoe 24 will be disposed above the plane of the wheel centers. This will cause the straddle rods 50 to be inclined upwardly toward the right but will not in any way interfere with the proper operation of the brake rigging.

Referring now to Figs. 9 and 10, in the modified form of brake rigging here illustrated the lower end of the live levers 12 disposed at the rear side of the wheel 2 is operatively connected in supporting relation thereto with one end of a brake beam 55, the opposite end of which is supported in a similar manner by the brake rigging associated with the truck wheel directly opposite the wheel 2. The lower end of the live lever 12 disposed at the forward side of the wheel 4 is similarly connected in supporting relation thereto with one end of a brake beam 57, the opposite end of which is similarly supported at the other side of the truck. The two brake beams 56 and 57 are connected intermediate their ends by a pull rod 58, and the brake beam 55 is operatively connected intermediate its ends by means of a pull rod 59 with the inner end of a transmitting lever 60 which corresponds to the transmitting lever 18 shown in Figs 1 and 2. The inner ends of the two brake cylinder levers 9 instead of being fulcrumed in fulcrum jaws secured to the truck frame as shown in Figs. 1 and 2 are fulcrumed in the fulcrum blocks of the automatic slack adjusters SCa and SCb. The remainder of the brake rigging illustrated in Figs. 9 and 10 is identical in all respects to the corresponding parts of the brake rigging shown in Figs. 1 and 2.

With the brake rigging constructed as shown in Figs. 9 and 10, when it is desired to effect a brake application, fluid pressure is simultaneously supplied to the brake cylinders Ca and Cb and the resultant outward movement of the associated push rods 8 rotates the two brake cylinder levers 9 in opposite directions about the fulcrum blocks of the slack adjusters. This rotation first rotates the live levers 12 to the positions in which the brake shoes 15 engage the associated wheels, whereupon these live levers are then caused to rotate about their points of connection with the brake heads 14. This rotation, in turn, moves the two brake beams 55 and 56 toward each other and hence causes a force to be transmitted to the brake shoe 24 through the pull rod 59, live lever 60 and brake lever 21 which moves the brake shoe 24 into frictional engagement with the wheel 2, and a corresponding force to be transmitted through the pull rod 58, brake beam 57 and hanger lever 37 which moves the brake shoe 40 into frictional engagement with the wheel 4. The parts are so designed and so proportioned that the forces exerted on the wheels by the associated brake shoes will be substantially equal as is customary in clasp brake designs. When the brakes have been applied in the manner described and it is desired to release the brakes, fluid pressure is vented from the brake cylinder and the parts are automatically returned to their released positions under the combined action of the release springs and the force of gravity acting on the parts.

If slack develops in the brake rigging, the additional piston strokes necessary to cause a brake application will cause the fulcrum blocks of the slack adjusters to move a sufficient amount to take up the slack as will be obvious.

Although I have herein shown and described only three forms of brake rigging embodying my invention, it is understood that various changes and modifications may be made therein within the scope of the appended claims without departing from the spirit and scope of my invention.

Having thus described my invention, what I claim is:

1. In a brake rigging, the combination with a truck frame and a supporting wheel therefor, of a live lever carrying means for frictionally engaging the wheel pivotally supported intermediate its ends for movement toward and away from the wheel, a brake cylinder mounted on the truck frame outboard of the wheels, a horizontally disposed brake cylinder lever fulcrumed at its inner end on a fixed fulcrum and operatively connected at its outer end with said brake cylinder and operatively connected intermediate its ends with the upper end of said live lever, an automatic slack adjuster, means including an equalizer lever connecting the lower end of said live lever with said automatic slack adjuster, and means connected with said equalizer lever for frictionally engaging the wheel at the side opposite to said first mentioned means.

2. In a brake rigging, the combination with a truck frame and a supporting wheel therefor, of a live lever carrying means for frictionally engaging the wheel pivotally supported intermediate its ends for movement toward and away from the wheel, a brake cylinder mounted on the truck frame outboard of the wheels, an automatic slack adjuster, a horizontally disposed brake cylinder lever fulcrumed at its inner end to said slack adjuster and operatively connected at its outer end with said brake cylinder and operatively connected intermediate its ends with the upper end of said live lever, and means for frictionally engaging the wheel at the side opposite to said first mentioned means operatively connected with the lower end of said live lever.

3. In a brake rigging for a four-wheel truck, the combination of a horizontal transversely extending brake cylinder lever for each wheel fulcrumed at its inner end on a fixed fulcrum, a brake cylinder for each wheel secured to the truck frame outboard of the associated wheel adjacent to the center of the truck and having its push rod operatively connected with the outer end of the associated brake cylinder lever, a live lever for each wheel pivotally supported intermediate its ends for movement toward and away from the associated wheel and operatively connected at its upper end with the associated brake cylinder lever intermediate its ends, means for frictionally engaging the one side of each wheel carried by the associated live lever, means for frictionally engaging the other side of each wheel operatively connected with the lower end of the associated live lever, the wheel engaging means which is located at the forward sides of the two forward wheels being disposed to engage the wheels above the wheel centers, the wheel engaging means which is located at the rear sides of the two rear wheels being disposed to engage the wheels below the wheel centers, and the remaining wheel engaging means being disposed to engage the wheels at substantially the plane of the wheel centers, whereby the lever forces which urge the wheel engaging means into frictional engagement with the wheels sets up on the truck a force component in opposition to that due to the rotation of the wheels.

4. In a brake rigging for a four-wheel truck, the combination with one of the wheels of a horizontal transversely extending brake cylinder lever fulcrumed at its inner end on a fixed fulcrum, a brake cylinder secured to the truck frame outboard of the wheel at the inner side of the wheel and having its push rod operatively connected with the outer end of said brake cylinder lever, a live lever pivotally supported intermediate its ends for movement toward and away from the wheel and operatively connected at its upper end with said brake cylinder lever intermediate its ends, an automatic slack adjuster, an equalizer lever operatively connected at one end with the lower end of said live lever and at the other end with said slack adjuster, a pull rod connected at one end with said equalizer lever intermediate its ends, a transmitting lever pivotally supported intermediate its ends and operatively connected at one end with the free end of said pull rod, a vertical brake lever pivotally supported intermediate its ends and operatively connected at its lower end with the other end of said transmitting lever, and means for frictionally engaging the other side of the wheel secured to the upper end of said brake lever.

5. In a brake rigging for a four-wheel truck, the combination with one of the wheels of a horizontal transversely extending brake cylinder lever fulcrumed at its inner end on a fixed fulcrum, a brake cylinder secured to the truck frame outboard of the wheel at the inner side of the wheel and having its push rod operatively connected with the outer end of said brake cylinder lever, a live lever pivotally supported intermediate its ends for movement toward and away from the wheel and operatively connected at its upper end with said brake cylinder lever intermediate its ends, means for frictionally engaging the one side of the wheel carried by said live lever, an automatic slack adjuster, an equalizer lever operatively connected at one end with the lower end of said live lever and at the other end with said slack adjuster, a pull rod connected at one end with said equalizer lever intermediate its ends, a transmitting lever pivotally supported at one end and operatively connected intermediate its ends with the free end of said pull rod, a hanger lever pivotally mounted at its upper end and operatively connected at its lower end with the other end of said transmitting lever, and means for frictionally engaging the other side of the wheel secured to said hanger lever.

6. In a brake rigging, the combination with a truck frame and a supporting wheel therefor, a horizontal transversely extending brake cylinder lever fulcrumed at its inner end to the truck frame at one side of the wheel, a live lever pivotally supported intermediate its ends at one side of the wheel by means of hanger levers and operatively connected at its upper end with said brake cylinder lever intermediate its ends, a brake cylinder mounted on the truck frame outboard of the wheel and operatively connected with the outer end of said brake cylinder lever, a brake beam pivotally connected at one end with the lower end of said live lever, a horizontally disposed transmitting lever pivotally mounted intermediate its ends on the truck frame and operatively connected at its inner end by means of a pull rod with said brake beam intermediate its ends, a vertical brake lever pivotally attached intermediate its ends to said truck frame and operatively connected at its outer end with the free end of said brake lever, and means for frictionally engaging the wheel secured respectively to said live and said brake levers.

7. In a brake rigging, the combination with a truck frame and a supporting wheel therefor, a hanger lever suspended at one side of the wheel, a live lever pivotally supported intermediate its ends at the other side of the wheel by means permitting it to move toward and away from the wheel, brake beams supported at one end by the lower ends of said hanger and live levers and operatively connected intermediate their ends by a pull rod, a brake cylinder secured to the truck frame outboard of the wheel, and a horizontal transversely extending brake cylinder lever fulcrumed at its inner end in a fixed fulcrum and operatively connected at its outer end with said brake cylinder and operatively connected intermediate its ends with the upper end of said live lever, and means for frictionally engaging the wheel secured respectively to said live and said brake levers.

8. In a brake rigging, the combination with a truck frame and a supporting wheel therefor, a hanger lever suspended at one side of the wheel, a live lever pivotally supported intermediate its ends at the other side of the wheel by means permitting it to move toward and away from the wheel, straddle rods connecting the lower ends of said hanger and live levers, an automatic slack adjuster secured to the truck frame inboard of the wheels, a brake cylinder secured to the truck frame outboard of the wheels, and a brake cylinder lever connected at one end with said automatic slack adjuster and at the other end with said brake cylinder and intermediate its ends with the upper end of said live lever.

9. In a clasp brake for a four wheel vehicle truck, the combination with the truck frame of means carried thereby for applying to the forward side of each of the forward wheels of the truck a braking force at a point located above the plane of the wheel centers and to the rear sides of each of the rear wheels of the truck a braking force at a point located below the plane of the wheel centers in such manner that the forces which are transmitted to the truck frame to produce the braking forces will produce force components in opposition to those resulting from the rotation of the wheels.

10. In a clasp brake for minimizing tipping in a four wheel vehicle truck, the combination with brake shoes disposed on opposite sides of each wheel, of lever means carried by the truck frame for supporting the shoes at the forward sides of the forward wheel above the plane of the wheel centers for movement to brake applying and releasing positions, other lever means carried by the truck frame for supporting the shoes at the rear side of the rear wheels below the plane of the wheel centers for movement to brake applying and releasing positions, and still other lever means carried by the truck frame for supporting the remaining shoes at or near the plane of the wheel centers for movement to brake applying and releasing positions, the parts being so proportioned that the forces which are applied to the shoes at the forward sides of the forward wheels and the rear sides of the rear wheels by the associated lever means to apply the brakes will cause force components to be exerted on the truck frame in opposition to those resulting from the frictional contact of these brake shoes with the rotating wheels.

EMIL G. MUELLER.

REFERENCES CITED

The following references are of record in the file of this patent:

UNITED STATES PATENTS

| Number | Name | Date |
|---|---|---|
| 1,261,485 | Burton | Apr. 2, 1918 |
| 1,269,257 | Burton | June 11, 1918 |
| 1,939,926 | Schwentler | Dec. 19, 1933 |
| 1,955,314 | Storer et al. | Apr. 17, 1934 |
| 1,994,180 | Redford | Mar. 12, 1935 |
| 2,028,623 | Redford | Jan. 21, 1936 |
| 2,135,438 | Baselt | Nov. 1, 1938 |